(No Model.)
J. REANEY.
MACHINE FOR CLEANING COFFEE AND OTHER GRAIN.
No. 292,681. Patented Jan. 29, 1884.
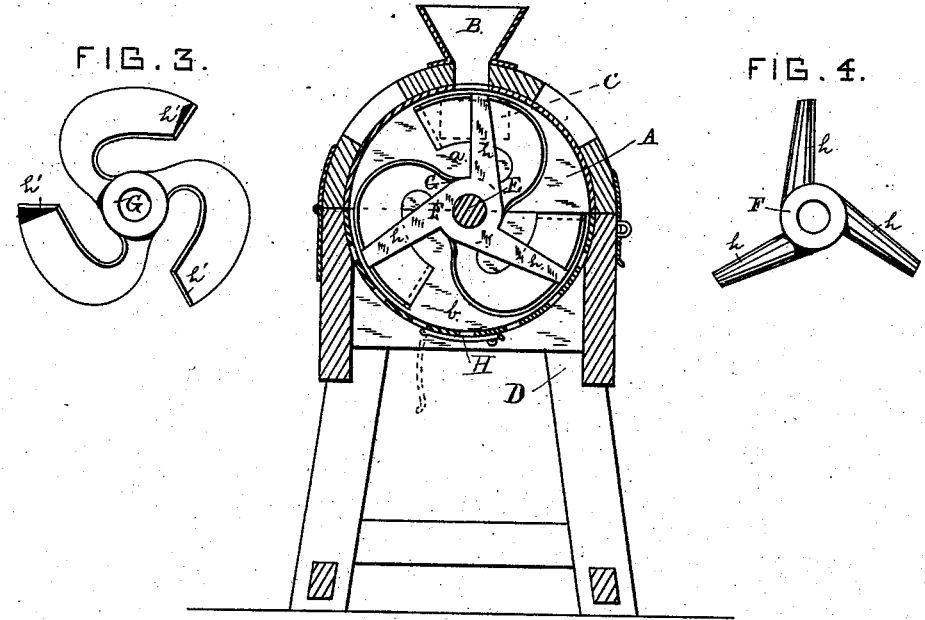
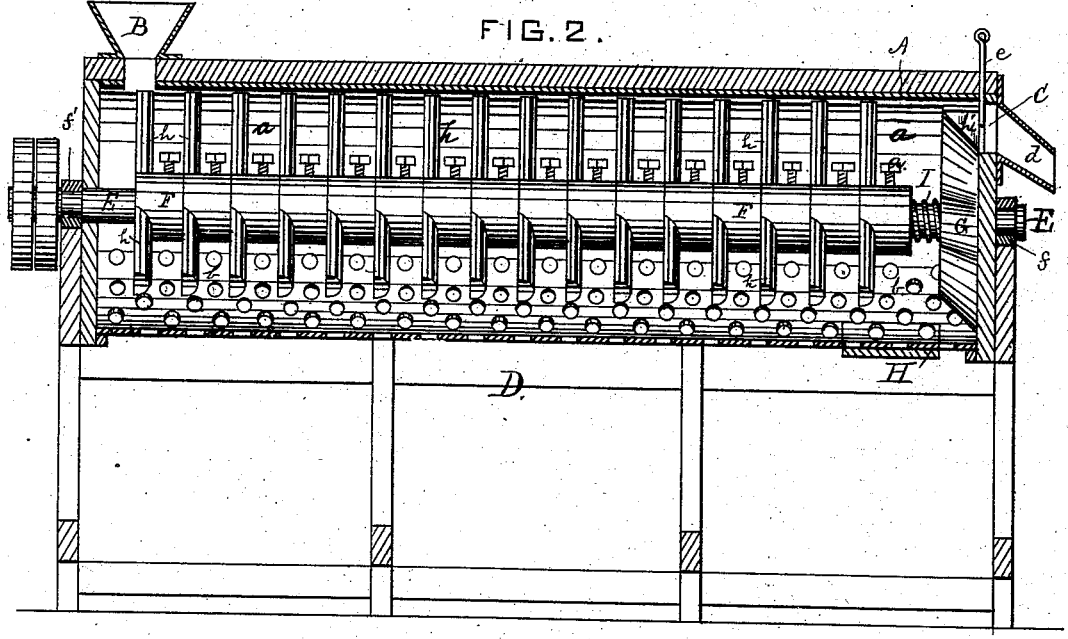
WITNESSES
Jno. R. Young
Alex Mahon
INVENTOR
John Reaney
By H. N. Jenkins
Attorney

UNITED STATES PATENT OFFICE.

JOHN REANEY, OF NEW ORLEANS, LOUISIANA.

MACHINE FOR CLEANING COFFEE AND OTHER GRAIN.

SPECIFICATION forming part of Letters Patent No. 292,681, dated January 29, 1884.

Application filed October 27, 1883. (No model.)

*To all whom it may concern:*

Be it known that I, JOHN REANEY, a resident of the city of New Orleans, parish of Orleans, and State of Louisiana, have invented a certain new and useful Improvement in Machines for Cleaning Coffee and other Grain; and I do hereby declare the following to be a full, clear, and correct description of the same, reference being had to the annexed drawings, making a part of this specification.

My invention comprises a horizontal cylinder having closed ends, in one of which is a discharge-opening, a central shaft provided with hubs or disks having radiating agitating-arms, a wheel for discharging the grain through the aforesaid opening, and a spring for pressing the discharge-wheel against the end containing said opening, all of which is hereinafter fully described.

In the accompanying drawings, Figure 1 is a vertical cross-section of the machine, the cut being made through the line of the feed-hopper, and the view being toward the rear or discharge end of the same. Fig. 2 is a vertical longitudinal section of the machine, showing the internal arrangement thereof. Fig. 3 represents the rear facing of the lifting or discharge wheel, and Fig. 4 a similar view of one of the hubs or disks having agitating or cleaning arms.

On the drawings, A designates a horizontal cylinder having closed ends and perforated bottom. This cylinder is preferably made in two sections, *a b*, which are hinged together at one side, in order that access may be had to the interior thereof whenever desired. The upper section, *a*, is provided near one of its ends with a feed-hopper, B, and in the opposite end with a discharge-opening, C, the latter provided with an outward chute, *d*, and a gate, *e*, for controlling the passage of grain through the same.

The cylinder A is supported in a suitable frame, D, the upper end pieces of which are provided with journal-boxes *f f'*, for the reception of the journals of a longitudinal central shaft, E, the ends of which project outward through holes made for said purpose in the opposite ends of the cylinder. On this shaft is secured by means of set-screws or otherwise a series of hubs or disks, F, having radiating agitating-arms *h*, which are provided with flat surfaces on the side toward the receiving end of the cylinder, and rounded sides toward the discharge end of the same. The rounded sides have a tendency to drive the grain toward the discharge end of the cylinder, while the flat sides serve to a certain extent to check the continuous movement thereof, thus insuring a thorough agitation of the grain by keeping it within the reach of the radial arms or agitators for a greater length of time than if the arms were made in other forms, or were the grain to be moved along in a steady manner.

The end of the shaft next the discharge end of the cylinder is provided with a "feather," (not shown,) over which is fitted a lifting or discharge-wheel, G, having angular blades, the ends of which are bent or flanged at right angles, as shown at *h'*, for the purpose of lifting the grain. This wheel is fitted on the shaft so that the blades shall incline toward the center of the discharge end of the machine.

I designates a spring which is coiled around the shaft between the discharge-wheel and the agitating hub or disk next thereto, for the purpose of keeping the discharge-wheel in close contact with the end of the machine, and thereby insuring its raising the grain to the discharge-opening.

The dust and dirt which are separated from the grain by the action of the agitating-arms are expelled through the perforations in the bottom of the cylinder, and any dirt or grain remaining in the cylinder after the stopping of the machine is removed therefrom through an opening in the bottom of the cylinder, said opening being provided with a sliding or hinged door, H, for closing the same when the machine is in operation.

Having thus described my invention, what I claim as new, and desire to secure by Letters Patent, is—

The herein-described grain-cleaning machine, comprising a horizontal cylinder, A, provided with closed ends, one of which is formed with a discharge-opening, C, a central shaft provided with hubs or disks F, having agitating-arms, a discharge-wheel, G, and a spring, I, substantially as described, and for the purpose set forth.

In testimony whereof I affix my signature in presence of two witnesses.

JOHN REANEY.

Witnesses:
J. N. MÜLLER,
ALFRED TANSLEY.